United States Patent
Yamashita et al.

(10) Patent No.: US 9,485,373 B2
(45) Date of Patent: Nov. 1, 2016

(54) PRINTING APPARATUS

(71) Applicant: SEIKO EPSON CORPORATION, Tokyo (JP)

(72) Inventors: Yusuke Yamashita, Nagano (JP); Takaaki Ishikawa, Nagano (JP); Ichiro Yoshioka, Nagano (JP); Tsuyoshi Himeno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/792,895

(22) Filed: Jul. 7, 2015

(65) Prior Publication Data

US 2016/0037007 A1  Feb. 4, 2016

(30) Foreign Application Priority Data

Aug. 4, 2014  (JP) .................... 2014-158454

(51) Int. Cl.
*B41J 2/01*   (2006.01)
*H04N 1/00*   (2006.01)

(52) U.S. Cl.
CPC ...... *H04N 1/00551* (2013.01); *H04N 1/00795* (2013.01)

(58) Field of Classification Search
CPC .......... B41J 2/442; B41J 2/01; B41J 11/006; B41J 11/0065; B41J 11/007; B41J 13/0054; B41J 13/103; B41J 13/106; B41J 13/12; B41J 13/18; B41J 13/223; B41J 13/226; B41J 13/24; B41J 13/32; B41M 1/34
USPC ................ 347/5, 14, 16, 211, 215, 218, 221
See application file for complete search history.

(56) References Cited

U.S. PATENT DOCUMENTS

| | | | |
|---|---|---|---|
| 8,511,818 B2* | 8/2013 | Nishikawa ................ | E05D 3/18 347/108 |
| 8,641,162 B2* | 2/2014 | Terada ................... | B41J 3/4071 347/16 |
| 8,955,833 B2* | 2/2015 | Suzuki ..................... | B41J 2/175 347/108 |
| 8,991,971 B2* | 3/2015 | Suzuki ..................... | B41J 2/135 347/108 |

FOREIGN PATENT DOCUMENTS

JP    2008-160714 A    7/2008

* cited by examiner

*Primary Examiner* — Kristal Feggins
(74) *Attorney, Agent, or Firm* — Global IP Counselors, LLP

(57) ABSTRACT

A printing apparatus includes an image reading unit that reads a document mounted on a document table, a printing unit that performs printing on a print medium fed from a feed opening, and a document cover which is supported openably/closably with respect to the document table and which supports the print medium inserted into the feed opening.

2 Claims, 7 Drawing Sheets

PRINTING APPARATUS

CROSS REFERENCES TO RELATED APPLICATIONS

The entire disclosure of Japanese Patent Application No. 2014-158454, filed Aug. 4, 2014 is incorporated by reference herein.

BACKGROUND

1. Technical Field

The present invention relates to a printing apparatus.

2. Related Art

A multi-function printer including a scanner and a printer has been known (for example, JP-A-2008-160714).

In the multi-function printer, when a large print medium is manually fed from a rear side, a support surface of a paper feed tray requires a sufficient area to support the large print medium, so that it prevents the printer from being downsized.

An object of the invention is to downsize a printing apparatus where a large print medium is manually fed.

SUMMARY

An advantage of some aspects of the invention is that the printing apparatus includes an image reading unit that reads a document mounted on a document table, a printing unit that performs printing on a print medium fed from a feed opening, and a document cover which is supported openably/closably with respect to the document table and which supports the print medium inserted into the feed opening.

According to the invention, a component for supporting the print medium inserted from the feed opening is not required in addition to the document cover, so that it is possible to reduce the number of components and to downsize the printing apparatus more than when the component and the document cover are separate bodies. Further, the document cover is normally closed except for being opened when the document is mounted or removed, so that the configuration of the invention does not prevent the size and the height of the printing apparatus from being reduced, and it is not necessary to change and reduce the shape of the printing apparatus by folding the document cover when the printing apparatus is not used.

Further, an advantage of some aspects of the printing apparatus of the invention is that the document cover may cover the document table and the feed opening when the document cover is in a closed state with respect to the document table, and the document cover may support the print medium inserted into the feed opening when the document cover is in an open state with respect to the document table.

In other words, the document cover that covers the document table also covers the feed opening in a state in which the document cover is closed, so that a lid that covers the feed opening is not required separately from the document cover. Therefore, it is possible to prevent dust and foreign objects from entering from the feed opening without increasing the number of components. According to a related art, when the document cover is in an open state, the feed opening from which a print medium is manually fed is not located between the document table and the document cover, but located outside between the document table and the document cover. When the feed opening is located between the document table and the document cover in an open state, the document cover in an open state can support the print medium inserted into the feed opening. A surface of the document cover that presses the document against the document cover has at least an area that covers the entire document table, so that it is possible to easily and stably support the print medium when supporting the print medium fed from the feed opening.

Further, an advantage of some aspects of the printing apparatus of the invention is that, in the document cover, an opening corresponding to at least a part of the feed opening is formed, and the printing unit may perform printing on the print medium inserted into the feed opening through the opening when the document cover is in a closed state with respect to the document table. The document cover needs to be closed to read a document mounted on the document table. According to this configuration, even when the document cover is in a closed state, the print medium can be inserted into the feed opening through the opening, so that when reading the document on the document table and performing printing (copying the document), it is possible to perform reading and printing while the document cover is closed.

Further, an advantage of some aspects of the printing apparatus of the invention is that the document cover may support the print medium inside the opening when the document cover is in a closed state with respect to the document table. The print medium can be supported not only inside the feed opening, but also inside the opening, so that it is possible to easily and stably support the print medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
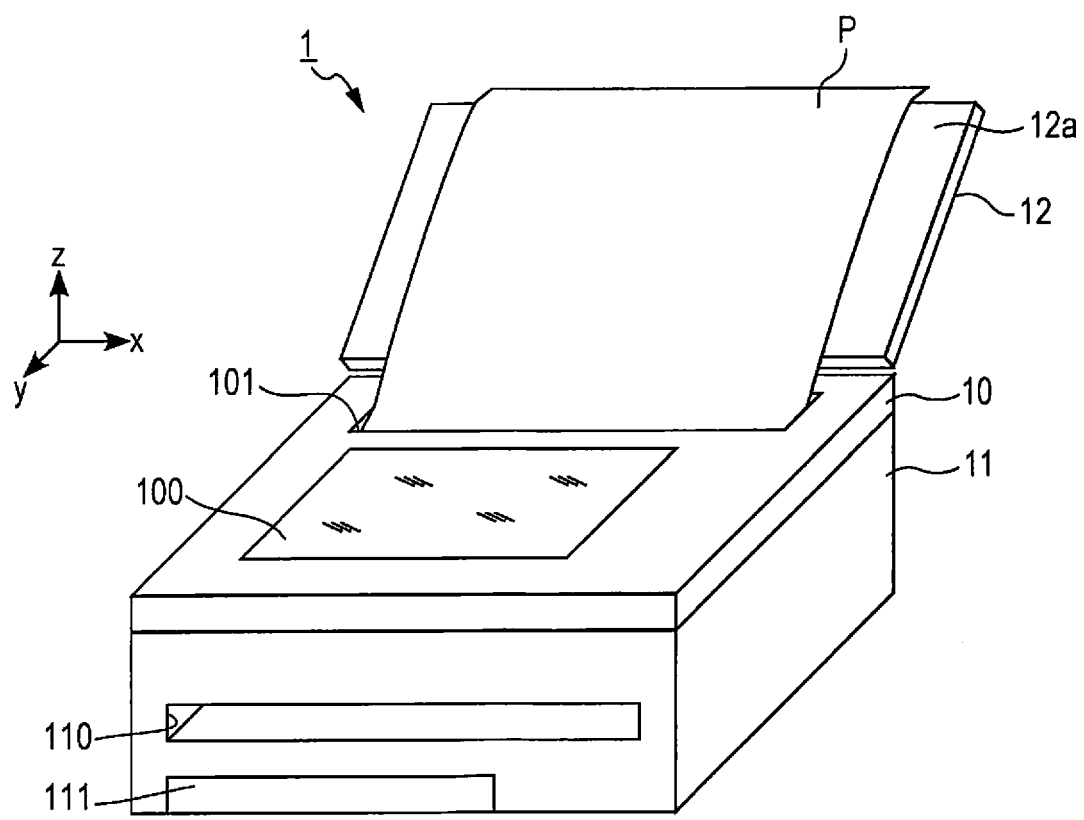
FIG. 1A is a perspective view showing a printing apparatus according to a first embodiment.

Hereinafter, embodiments of the invention will be described in order with reference to the accompanying drawings. Corresponding components in the drawings are denoted by the same reference numerals, and redundant description is omitted.

1. First Embodiment

Figure 1B:
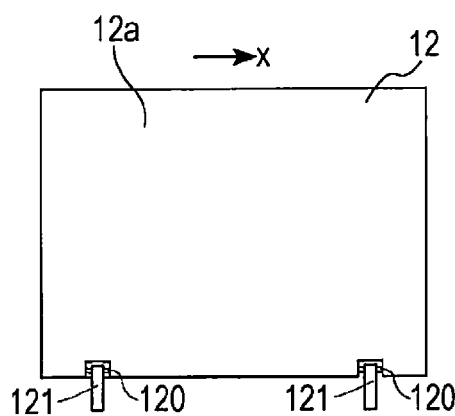
FIG. 1B is a plan view showing a document cover.
Figure 1D:
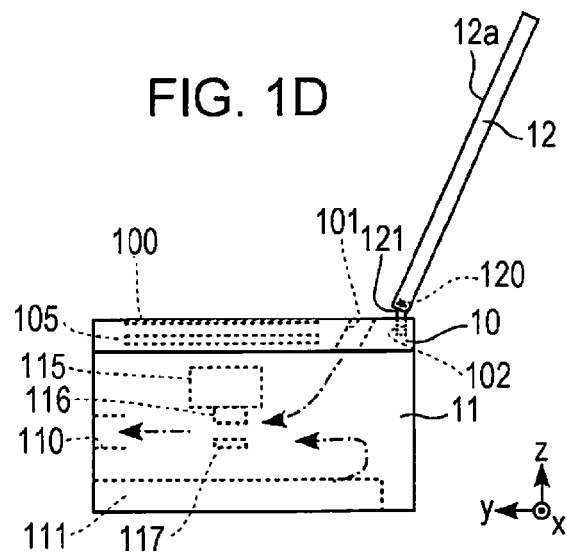
FIGS. 1D and 1E are each side view showing the printing apparatus.
Figure 1C:
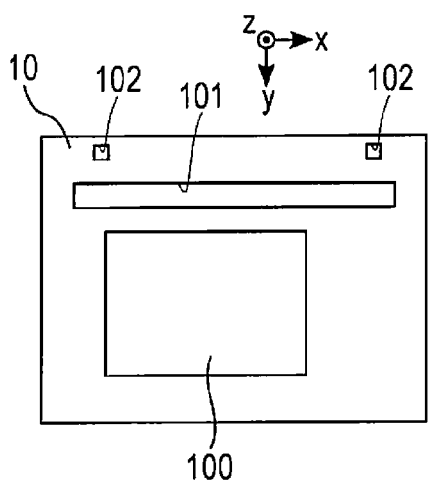
FIG. 1C is a top view showing a scanner housing.
Figure 1E:
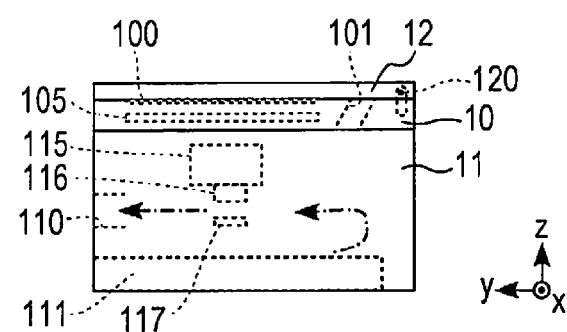

FIG. 1A is a perspective view of a multi-function printer (MFP) 1 as a printing apparatus according to a first embodiment. The MFP 1 is configured as an ink jet printer including a flatbed type scanner and includes a scanner housing 10, a document cover 12, and a printer housing 11. FIG. 1B is a plan view showing the document cover 12. FIG. 1C is a top view showing the scanner housing 10. FIGS. 1D and 1E are side views showing the MFP 1. The scanner housing 10 supports a document table 100 with a rectangular shape formed of a transparent glass plate. In the present specification, a direction in parallel with a long side of the document table 100 is defined as an x axis, a direction in parallel with a short side of the document table 100 is defined as a y axis, and a direction perpendicular to the x axis and the y axis is defined as a z axis. In the present embodiment, for example, a document up to A4 size can be mounted on the document table 100.

The scanner housing 10 is stacked in a direction in parallel with the z axis of the printer housing 11 and attached to the printer housing 11. In the present specification, as shown in FIG. 1A, in a direction in parallel with the z axis, a direction indicated by an arrow of the z axis is represented as above and a direction opposite to the direction indicated by the arrow of the z axis is represented as below. Further, as shown in FIG. 1A, in a direction in parallel with the y axis, a direction indicated by an arrow of the y axis is represented as front and a direction opposite to the direction indicated by the arrow of the y axis is represented as rear.

An image reading unit is housed inside the scanner housing 10. The image reading unit includes a sensor unit 105 which is arranged below the document table 100 and has a shape elongated in a direction in parallel with the y axis, a motor (not shown in the drawings) that moves the sensor unit 105 in a direction in parallel with the x axis below the document table 100, and a guide rail (not shown in the drawings).

A shaft 120 and a connecting member 121 that rotates around the shaft 120 with respect to the document cover 12 are attached to the document cover 12. The connecting member 121 is fitted into a recessed portion 102 formed in the scanner housing 10. In a state in which the connecting member 121 is fitted into the recessed portion 102, the document cover 12 can be opened and closed with respect to the document table 100 around the shaft 120. FIG. 1D shows a state in which the document cover 12 is opened with respect to the document table 100 and FIG. 1E shows a state in which the document cover 12 is closed with respect to the document table 100. When the document cover 12 is in a closed state, the document cover 12 is supported by the scanner housing 10 and is in a stable state. As shown in FIG. 1D, when the document cover 12 is in an open state, for example, a stop mechanism (not shown in the drawings) is provided to the connecting member 121 so that the document cover 12 does not open wider with respect to the document table 100 than when the document cover 12 is in the open state. The document cover 12 moves from the closed state to the open state shown in FIG. 1D through an unstable state, and becomes stable. An angle between the document table 100 and the document cover 12 when the document cover 12 is in the open state is designed related to a position of a feed opening 101 to manually feed a print medium described later and an angle of a transport path of a print medium P, and the angle shown in FIG. 1D is just an example.

When the document cover 12 is in the open state with respect to the document table 100, the document cover 12 only has to be openably/closably supported so as to be located in the rear of the feed opening 101 described later in a direction in parallel with the y axis (so that the feed opening 101 is located between the document table 100 and the document cover 12 in the open state), and various known configurations other than the above configuration can also be employed as a support mechanism of the document cover 12.

The feed opening 101 for feeding (manually feeding) the print medium P to a printing unit described later is formed in the upper surface of the scanner housing 10. As shown in FIG. 1E, when the document cover 12 is in the closed state with respect to the document table 100, the feed opening 101 is covered by the document cover 12. Therefore, it is possible to prevent dust and foreign objects from entering the inside of the feed opening 101. Further, the document cover 12 is used as a lid to close the feed opening 101 when it is not in use, so that it is possible to reduce the number of components as compared with a case in which the document cover 12 and the lid are formed by different bodies.

The printing unit is housed inside the printer housing 11. The printing unit includes a transport mechanism including a plurality of rollers (not shown in the drawings) that transport the print medium and a motor (not shown in the drawings) that rotationally drives the rollers, a carriage 115 that houses an ink tank and the like, a recording head 116 which is provided at a bottom portion of the carriage 115 and discharges ink, a motor (not shown in the drawings) that reciprocates the carriage 115 in a direction in parallel with the x axis, and a platen 117 that supports the print medium at a position facing the recording head 116.

A cassette 111 where print media to be fed to the printing unit are loaded is attached to the printer housing 11. In other words, a feeding method of a print medium in the MFP 1 can be selected from two methods, which are a feed from the cassette 111 and a manual feed from the feed opening 101. The cassette 111 slides in a direction in parallel with the y axis and can be attached to and detached from the printer housing 11. The print media in the cassette 111 are picked up one by one by a roller or the like (not shown in the drawings) and transported to a gap between the recording head 116 and the platen 117. The print media P inserted from the feed opening 101 are transported one by one to a gap between the recording head 116 and the platen 117 by a roller not shown in the drawings. The print media in the cassette 116 are picked up one by one by a roller or the like (not shown in the drawings) and transported to a gap between the recording head 116 and the platen 117. The print media passed through between the recording head 116 and the platen 117 is transported to a discharge port 110 by a roller not shown in the drawings. An arrow of a dashed-dotted line shown in FIGS. 1D and 1E indicates a transport path of the print medium.

The document cover 12 has not only a function to press a document against the document table 100 when the document mounted on the document table 100 is read, but also a function to support the print medium P when the print medium P is fed from the feed opening 101 in the present embodiment. When the document cover 12 is in the open state with respect to the document table 100, the print medium P is supported by a facing surface 12a of the document cover 12 which faces the document table 100. In the present embodiment, when the print medium P is manually fed from the feed opening 101, the document cover 12 is used as a support portion (an ordinary manual paper feed tray) that supports the print medium P, so that it is possible to reduce the number of components as compared with a case in which the document cover 12 and the support portion are formed by different bodies. Further, the document cover 12 is normally closed except for being opened when the document is mounted or removed, so that the document cover 12 does not prevent the height of the MFP 1 from being lowered (does not prevent the height (the length in a direction in parallel with the z axis) of the MFP 1 from being designed to be low as much as possible), and it is not necessary to change and reduce the shape of the MFP 1 by folding the document cover 12 when the MFP 1 is not used. Therefore, a user can prepare the document cover 12 that functions as a support portion supporting the print medium P to be manually fed by performing the same operation as that performed when the document cover 12 that is normally closed is opened in order to read a document. Therefore, the MFP 1 is easy to be used by a user. In the present embodiment, the facing surface 12*a* is as large as a surface of the scanner housing 10 in parallel with an xy plane, so that it is possible to easily and stably support the print medium P when supporting the print medium P fed from the feed opening 101. The document cover 12 is larger than the document table 100. Therefore, the document cover 12 can support the entire print medium larger than a document that can be read.

When copying a document and performing printing on the print medium M that is manually fed from the feed opening 101, a two-stage operation only has to be performed in which the document to be copied is mounted on the document table 100, the document cover 12 is closed, and the document is read and stored in a memory, and thereafter, the document cover 12 is opened, the print medium P is inserted into the feed opening 101 and supported by the document cover 12, and printing is performed based on image data in the memory. However, in the MFP 1, a print medium can also be fed from the cassette 111, so that when a document is copied to the print medium in the cassette 111, it is not necessary to perform the two-stage operation described above. For example, when print media up to A4 size can be set in the cassette 111 and a print medium up to A2 size can be set in the feed opening 101, it is assumed that a print medium manually fed from the feed opening 101 is mainly print media larger than A4. It is assumed that the print media larger than A4 are much more used for printing based on, for example, high resolution image data transmitted from an external apparatus such as a PC (Personal Computer) through a communication I/F unit not shown in the drawings than for enlarging and copying a document mounted on the A4 size document table 100. Therefore, it is estimated that, in practice, a user does not often perform the two-stage operation described above, and effects of the configuration of the present embodiment described above (the configuration in which the document cover 12 in the open state supports the print medium to be manually fed) are sufficiently beneficial for the user.

A guide (not shown in the drawings) that can slide in a direction in parallel with the x axis may be provided in the feed opening 101 in order to position a print medium P to be transported for each size. When the guide is provided on the facing surface 12*a* of the document cover 12, the facing surface 12*a* cannot be closely attached to the document table 100 when the document cover 12 is caused to be in the closed state with respect to the document table 100. Therefore, a mechanism where the guide can be attached to and detached from the document cover 12 is required. However, it is possible to realize a guide function of the print medium P without complicating the configuration of the document cover 12 by providing the guide in the feed opening 101.

2. Second Embodiment

Figure 2A:
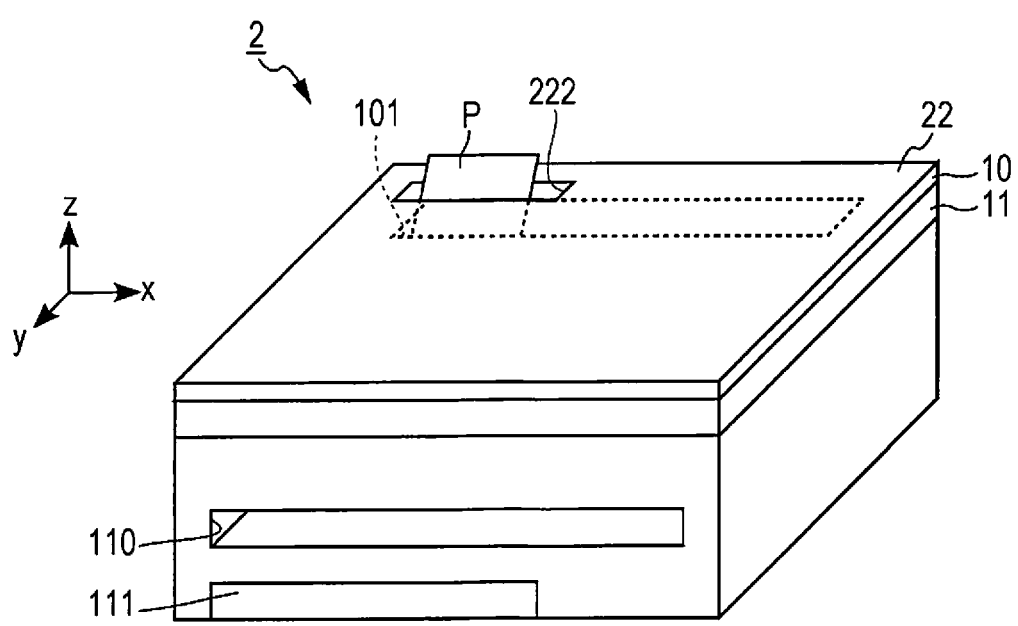
FIG. 2A is a perspective view showing a printing apparatus according to a second embodiment.
Figure 2B:
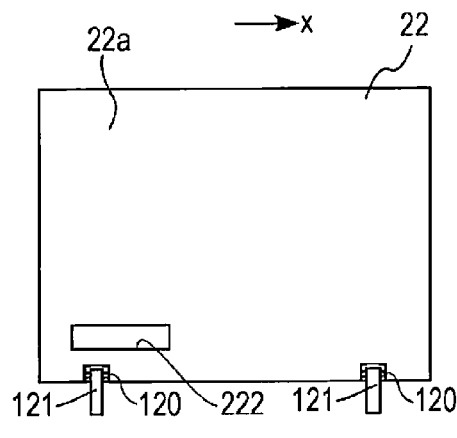
FIG. 2B is a plan view showing a document cover.
Figure 2C:
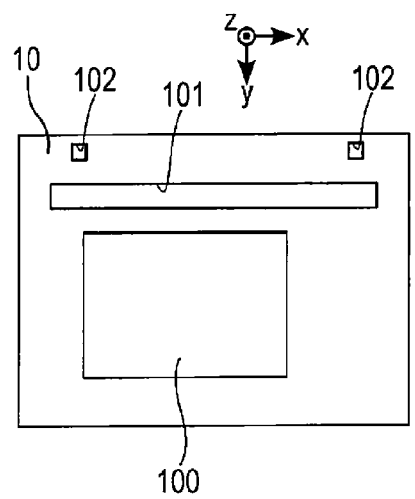
FIG. 2C is a top view showing a scanner housing.
Figure 2D:
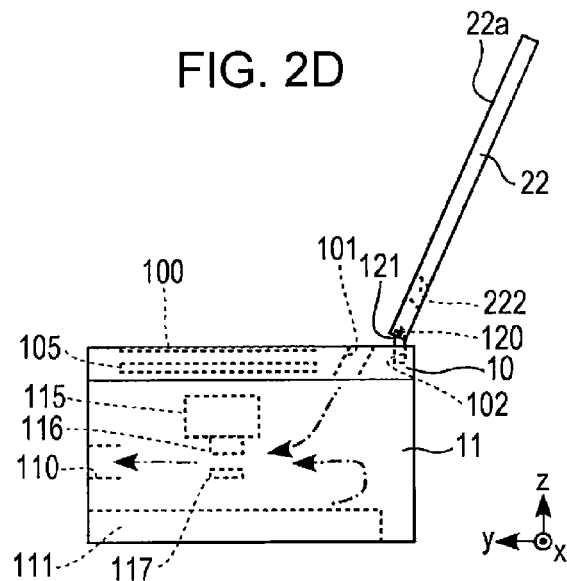
FIGS. 2D and 2E are each side view showing the printing apparatus.
Figure 2E:
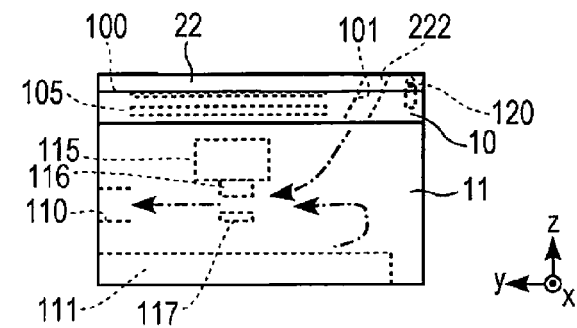

FIGS. 2A to 2E show an MFP 2 which is a printing apparatus according to a second embodiment. FIG. 2A is a perspective view showing the MFP 2 in a state in which a document cover 22 is closed. FIG. 2B is a plan view showing the document cover 22. FIG. 2C is a top view of a scanner housing 10. FIG. 2D is a side view showing the MFP2 in a state in which the document cover 22 is open. FIG. 2E is a side view showing the MFP 2 in a state in which the document cover 22 is closed. A difference from the first embodiment is that an opening 222 is formed in an area in the document cover 22 corresponding to a part of the feed opening 101.

In the present embodiment, it is assumed that the opening 222 is, for example, a rectangular opening whose length in a direction in parallel with the x axis is longer than a short side of an L-type print medium and is shorter than a short side of an A2 print medium. In the present embodiment, the length of the feed opening 101 in a direction in parallel with the x axis is equal to the length of the short side of A2 print medium.

For example, when print media other than L-type (for example, an A4 print media) are loaded in the cassette 111 and an L-type document is desired to be copied to an L-type print medium P, the MFP 2 of the present embodiment is convenient. The above will be specifically described. When the opening 222 is not formed in the document cover 22, it is required that a two-stage operation is performed in which the document cover 22 is closed and the L-type document is read and thereafter the document cover 22 is opened, the L-type print medium P is set in the feed opening 101, and printing is performed on the print medium P, or the print media loaded in the cassette 111 are removed, an L-type print medium is set in the cassette 111, and the copy is performed. However, in the MFP 2, the print medium P can be set in the feed opening 101 through the opening 222 in a state in which the document cover 22 is closed with respect to the document table 100, so that the MFP 2 is convenient because it is not required to perform the two-stage operation as described above and it is not necessary to replace the print media in the cassette 111 with an L-type print medium. Further, when the print medium P is set in the feed opening 101 through the opening 222 in a state in which the document cover 22 is closed, the print medium P can be supported by not only the inside of the feed opening 101, but also by the inside of the opening 222, so that it is possible to easily and stably support the print medium P. Of course, a large print medium such as an A2 print medium can be set in the feed opening 101 in a state in which the document cover 22 is open in the same manner as in the first embodiment (the print medium is supported by the facing surface 22*a*).

The opening 222 is smaller than the feed opening 101, so that the document cover 22 functions as a lid with respect to at least a part of the feed opening 101. A lid not shown in the drawings may be provided to the opening 222 to prevent dust.

3. Third Embodiment

Figure 3A:
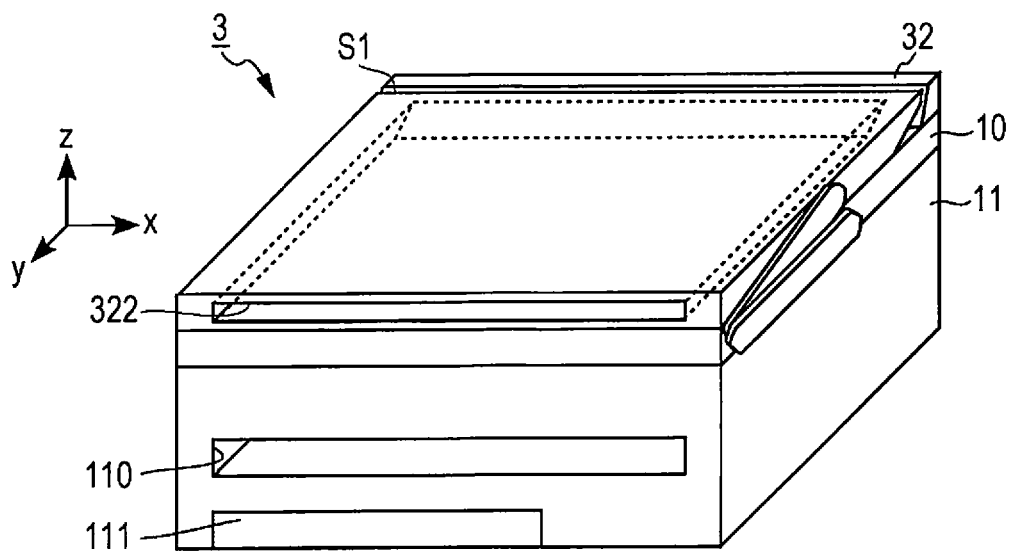
FIG. 3A is a perspective view showing a printing apparatus according to a third embodiment.
Figure 3B:
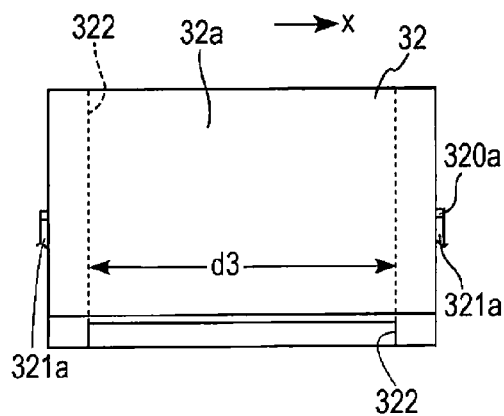
FIG. 3B is a plan view showing a document cover.
Figure 3D:
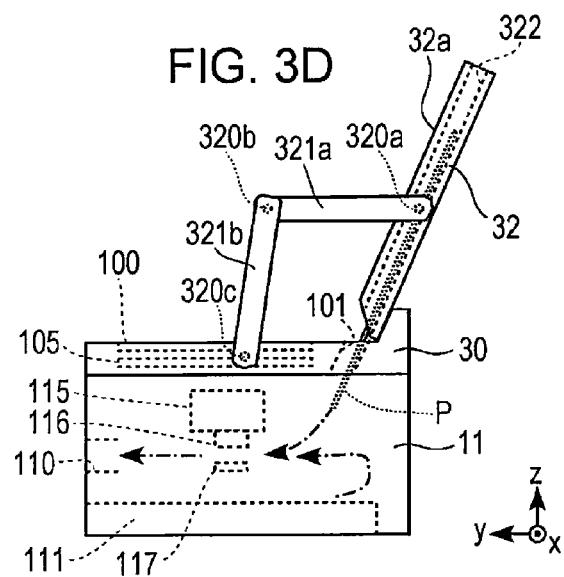
FIGS. 3D and 3E are each side view showing the printing apparatus.
Figure 3C:
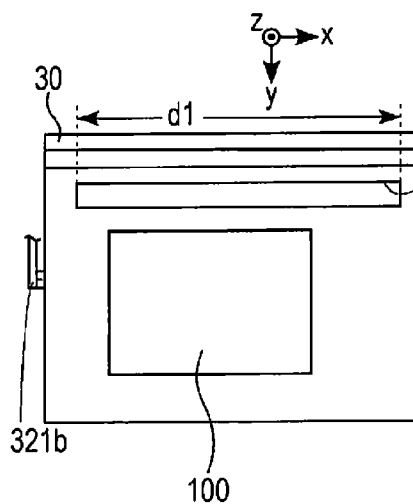
FIG. 3C is a top view showing a scanner housing.
Figure 3E:
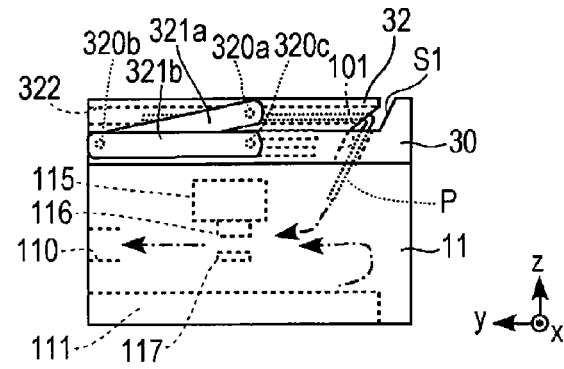

FIGS. 3A to 3E show an MFP 3 which is a printing apparatus according to a third embodiment. FIG. 3A is a perspective view showing the MFP 3 in a state in which a document cover 32 is closed. FIG. 3B is a plan view showing the document cover 32. FIG. 3C is a top view showing a scanner housing 30. FIG. 3D is a side view showing the MFP3 in a state in which the document cover 32 is open with respect to the document table 100. FIG. 3E is a side view showing the MFP3 in a state in which the document cover 32 is closed. The document cover 32 of the present embodiment is connected to the scanner housing 30 by connecting members 321a and 321b. The connecting member 321b rotates around a shaft 320c. The shaft 320c is fitted into the scanner housing 30. The connecting member 321a rotates around a shaft 320a. The shaft 320a is fitted into the document cover 32. The connecting members 321a and 321b rotate with respect to each other around a shaft 320b. The document cover 32 can rotate around each of the shafts 320a, 320b, and 320c and is opened and closed with respect to the document table 100.

An opening 322 is formed in the document cover 32. The opening 322 opens in a direction perpendicular to the shaft 320a and in parallel with a facing surface 32a (a surface facing the document table 100). As shown in FIGS. 3B and 3C, the length d3 of the opening 322 in a direction in parallel with the x axis is formed to the same as the length d1 of the feed opening 101 in a direction in parallel with the x axis.

As shown in FIG. 3D, the opening 322 and the feed opening 101 are connected in a state in which the document cover 32 is open. The print medium P inserted from the opening 322 of the document cover 32 at the far side from the feed opening 101 reaches the inside of the printer housing 11 through the inside of the opening 322 and the inside of the feed opening 101. The document cover 32 can be closed in a state in which the tip of the print medium P reaches a transport mechanism (not shown in the drawings) inside the printer housing 11. In other words, in the present embodiment, as shown in FIG. 3D, it is possible to feed the print medium P from the feed opening 101 and perform printing in a state in which the document cover 32 is open, and as shown in FIG. 3E, it is also possible to feed the print medium P from the feed opening 101 and perform printing even in a state in which the document cover 32 is closed.

As shown in FIGS. 3A and 3E, a slit S1 occurs between an end portion of the document cover 32 at the near side to the feed opening 101 and the scanner housing 30 in a state in which the document cover 32 is closed. In a state in which the document cover 32 is closed, a small print medium with low flexibility such as, for example, an L-type print medium may be inserted from the slit S1 and printing may be performed. The opening is not limited to an opening whose entire circumference is surrounded by the document cover 32, but a part of the opening may be a cut-away section connected to the document cover 32.

4. Other Embodiments

Figure 4A:
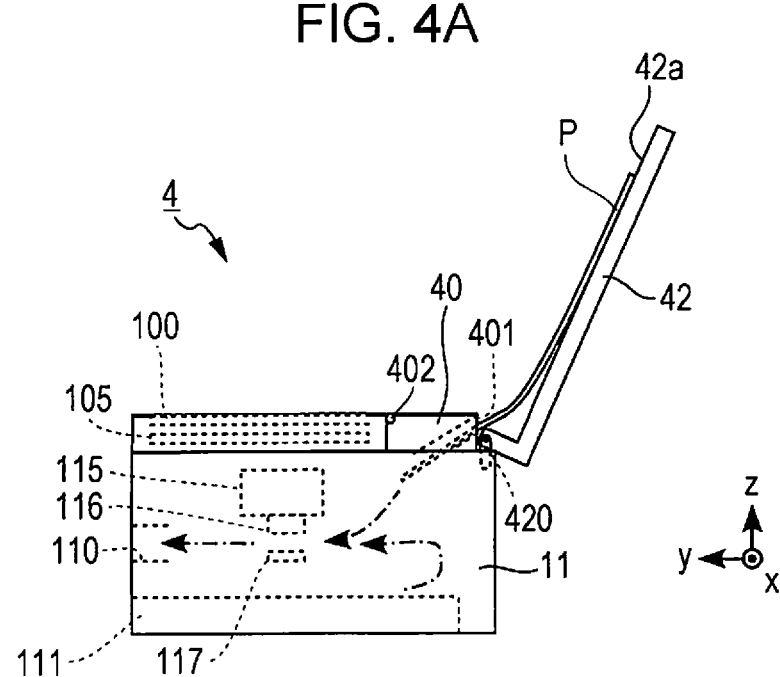
FIG. 4A is a side view showing a printing apparatus according to another embodiment.
Figure 4B:
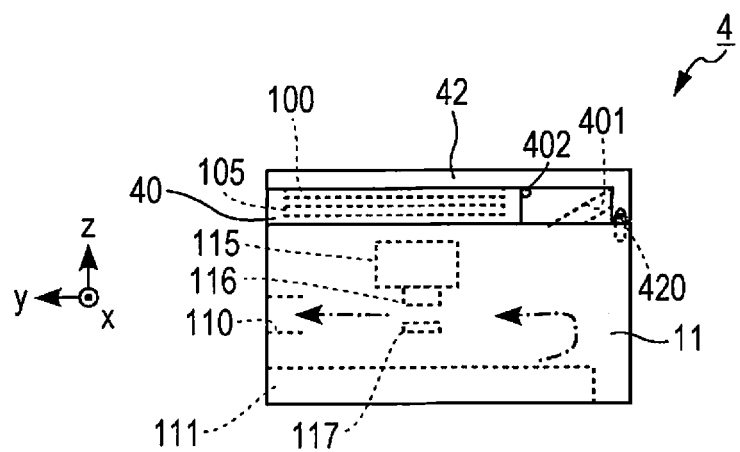
FIG. 4B is a side view showing the printing apparatus according to the other embodiment.

The technical scope of the invention is not limited to the embodiments described above, and of course, various modifications may be added without departing from the scope of the invention. For example, in the embodiments described above, the feed opening 101 is formed in the upper surface of the scanner housing 10 or 30. However, the feed opening 101 need not necessarily be formed in the upper surface. For example, as shown in FIGS. 4A and 4B, a feed opening 401 may be formed in the rear surface of a scanner housing 40. As shown in FIG. 4A, when a document cover 42 is in an open state with respect to the document table 100, the print medium P can be set in the feed opening 401 while being supported by a facing surface 42a that faces the document table 100 of the document cover 42. A cross-section of the document cover 42 in parallel with a yz plane is L-shaped. As shown in FIG. 4B, when the document cover 42 is in a closed state, the feed opening 401 is covered by the document cover 42, so that it is possible to prevent dust and foreign objects from entering the inside of the feed opening 401. In the example in FIGS. 4A and 4B, the document cover 42 is supported by the printer housing 11 so that the document cover 42 rotates around a shaft 420 and is opened and closed with respect to the document table 100. Further, the scanner housing 40 may be configured to be able to rotate around a shaft 402 and to be able to be opened and closed with respect to the printer housing 11 when the document cover 42 is in an open state.

Further, as configurations of the image reading unit and the printing unit; various configurations can be employed in addition to the embodiments described above. For example, an area sensor may be employed in the image reading unit. The printing unit may be configured as a page printer or may be configured as a dye sublimation printer.

What is claimed is:

1. A multifunction printing apparatus comprising:
    a printing unit configured and arranged to perform printing on a print medium;
    an image reading unit configured and arranged to read a document mounted on a document table, the image reading unit being located above the printing unit;
    a feed opening configured and arranged to feed a print medium to the printing unit from above the printing unit; and
    a document cover configured and arranged to be used in an open state or a closed state with respect to the document table, the document cover being located above the image reading unit,
    the document cover being further configured and arranged to cover the document table when the image reading unit reads a document in the closed state of the document cover, and
    the document cover being further configured and arranged to support a print medium that is inserted into the feed opening when the printing unit performs printing in the open state of the document cover.

2. The multifunction printing apparatus according to claim 1, wherein
    in the document cover, a document cover opening is formed in a position corresponding to at least a part of the feed opening, and
    the printing unit is further configured and arranged to perform printing on the print medium inserted into the feed opening through the document cover opening when the document cover is in the closed state with respect to the document table.

* * * * *